United States Patent
McCaffrey (10) Patent No.: US 9,103,214 B2
(45) Date of Patent: Aug. 11, 2015

(54) CERAMIC MATRIX COMPOSITE VANE STRUCTURE WITH OVERWRAP FOR A GAS TURBINE ENGINE

(75) Inventor: Michael G. McCaffrey, Windsor, CT (US)

(73) Assignee: UNITED TECHNOLOGIES CORPORATION, Hartford, CT (US)

( * ) Notice: Subject to any disclaimer, the term of this patent is extended or adjusted under 35 U.S.C. 154(b) by 916 days.

(21) Appl. No.: 13/215,292

(22) Filed: Aug. 23, 2011

(65) Prior Publication Data

US 2013/0052030 A1 Feb. 28, 2013

(51) Int. Cl.
| F01D 5/14 | (2006.01) |
| F01D 5/34 | (2006.01) |
| F01D 9/04 | (2006.01) |

(52) U.S. Cl.
CPC ............... F01D 5/147 (2013.01); F01D 9/041 (2013.01); *F05D 2300/6033* (2013.01)

(58) Field of Classification Search
CPC ... F05D 2300/6033; F01D 5/147; F01D 5/14; F01D 5/22; F01D 5/34; F01D 5/3084; F01D 5/282; F01D 5/284; F01D 9/04; F01D 9/041; F01D 9/042; F01D 9/044; F04D 29/02
USPC .............. 416/189, 191, 204 A, 219 R, 220 R, 416/223 A, 229 A, 239, 241 B, 248; 415/200
See application file for complete search history.

(56) References Cited

U.S. PATENT DOCUMENTS

| 3,403,844 | A | * | 10/1968 | Stoffer | 416/230 |
| 4,786,347 | A | * | 11/1988 | Angus | 156/172 |
| 5,688,426 | A | | 11/1997 | Kirkwood et al. | |
| 6,196,794 | B1 | * | 3/2001 | Matsumoto | 415/191 |
| 6,676,373 | B2 | * | 1/2004 | Marlin et al. | 415/191 |
| 7,198,472 | B2 | * | 4/2007 | McMillan et al. | 416/234 |
| 7,329,101 | B2 | | 2/2008 | Carper et al. | |
| 7,371,043 | B2 | * | 5/2008 | Keller | 415/173.1 |
| 7,452,182 | B2 | * | 11/2008 | Vance et al. | 415/135 |
| 7,491,032 | B1 | * | 2/2009 | Powell et al. | 416/230 |
| 7,560,139 | B2 | | 7/2009 | Thebault et al. | |
| 7,648,336 | B2 | | 1/2010 | Cairo | |
| 7,686,577 | B2 | | 3/2010 | Morrison et al. | |
| 2008/0220207 | A1 | * | 9/2008 | Ravey | 428/119 |
| 2010/0189566 | A1 | * | 7/2010 | Harrison | 416/241 R |
| 2011/0206522 | A1 | * | 8/2011 | Alvanos et al. | 416/204 R |

* cited by examiner

*Primary Examiner* — Dwayne J White
*Assistant Examiner* — Joshua R Beebe
(74) *Attorney, Agent, or Firm* — Carlson, Gaskey & Olds, P.C.

(57) ABSTRACT

A vane structure for a gas turbine engine includes an airfoil section with a platform segment adjacent to a ring. An insert is adjacent to the platform segment and an overwrap is wound around the ring and the insert.

23 Claims, 9 Drawing Sheets

CERAMIC MATRIX COMPOSITE VANE STRUCTURE WITH OVERWRAP FOR A GAS TURBINE ENGINE

BACKGROUND

The present disclosure relates to a gas turbine engine, and more particularly to Ceramic Matrix Composite (CMC) components therefor.

The turbine section of a gas turbine engine includes a multiple of airfoils which operate at elevated temperatures in a strenuous, oxidizing type of gas flow environment and are typically manufactured of high temperature superalloys. CMC materials provide higher temperature capability than metal alloys and a high strength to weight ratio. CMC materials, however, may require particular manufacturing approaches as the fiber orientation primarily determines the strength capability.

SUMMARY

A vane structure for a gas turbine engine according to an exemplary aspect of the present disclosure includes an airfoil section with a platform segment adjacent to a ring. An insert adjacent to the platform segment. An overwrap wound around the ring and the insert.

A vane structure for a gas turbine engine according to an exemplary aspect of the present disclosure includes an insert adjacent to first and second T-shaped platform segments. An overwrap is wound around a ring and the first and second T-shaped platform segments.

A vane structure for a gas turbine engine according to an exemplary aspect of the present disclosure includes according to an exemplary aspect of the present disclosure includes: positioning an airfoil section with a platform segment adjacent to a ring; positioning an insert at least partially over the platform segment; and winding an overwrap around the ring and the insert.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
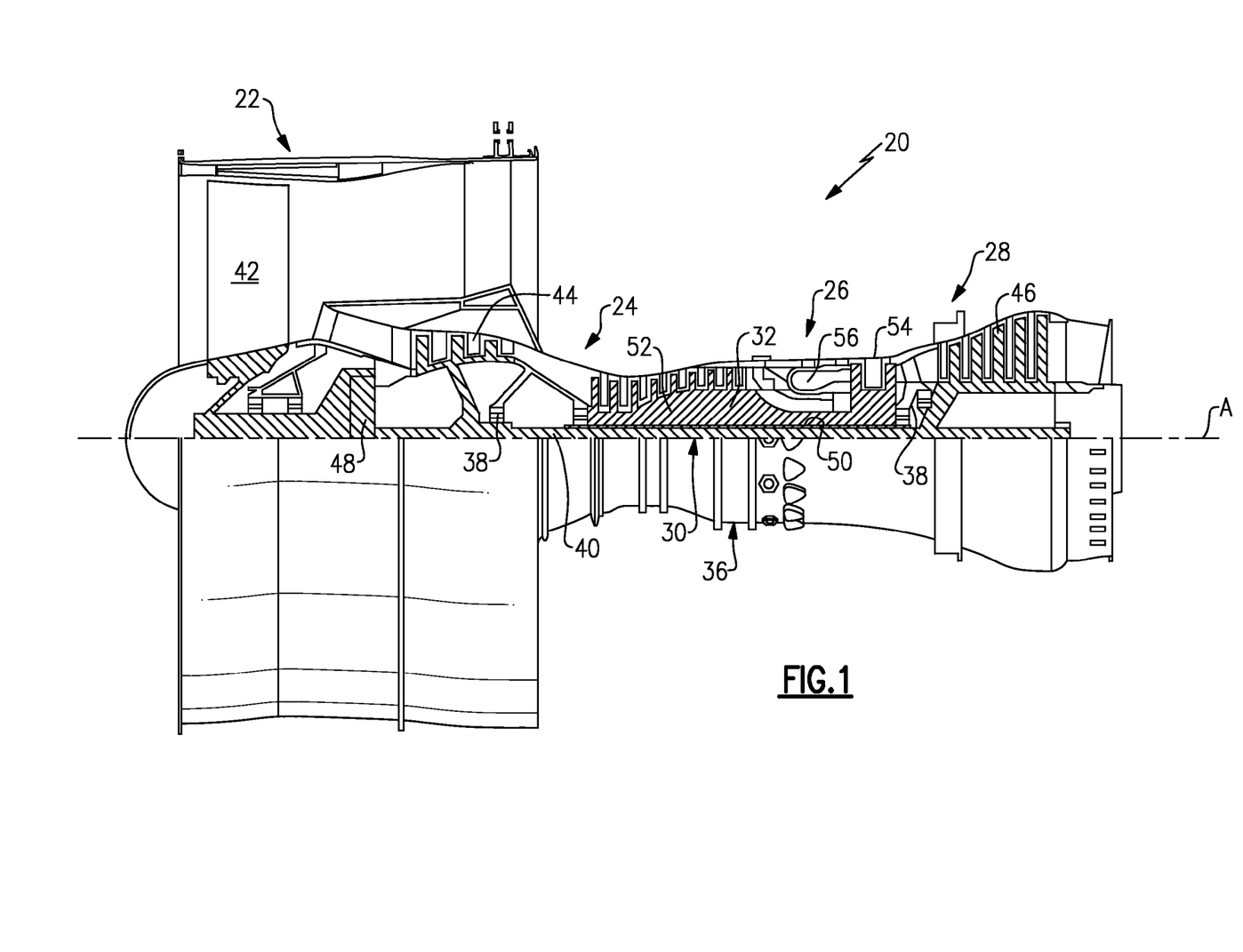
FIG. 1 is a schematic cross-section of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flowpath while the compressor section 24 drives air along a core flowpath for compression and communication into the combustor section 26 then expansion through the turbine section 28. Although depicted as a turbofan gas turbine engine in the disclosed non-limiting embodiment, it should be understood that the concepts described herein are not limited to use with turbofans as the teachings may be applied to other types of turbine engines.

The engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that interconnects a fan 42, a low pressure compressor 44 and a low pressure turbine 46. The inner shaft 40 is connected to the fan 42 through a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged between the high pressure compressor 52 and the high pressure turbine 54. The inner shaft 40 and the outer shaft 50 are concentric and rotate about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 54, 56 rotationally drive the respective low speed spool 30 and high speed spool 32 in response to the expansion.

Figure 2:
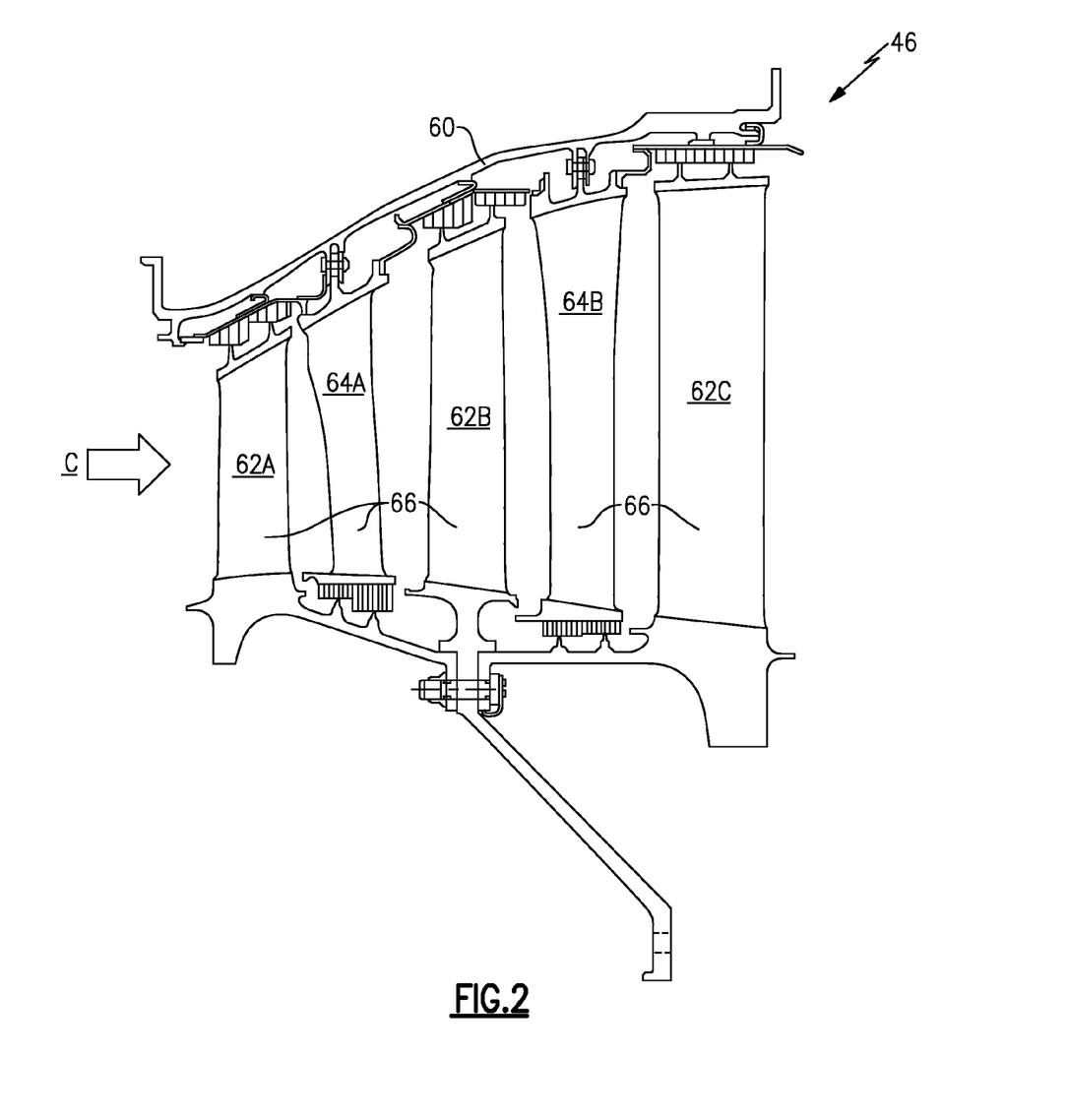
FIG. 2 is an enlarged sectional view of a Low Pressure Turbine section of the gas turbine engine.
Figure 3:
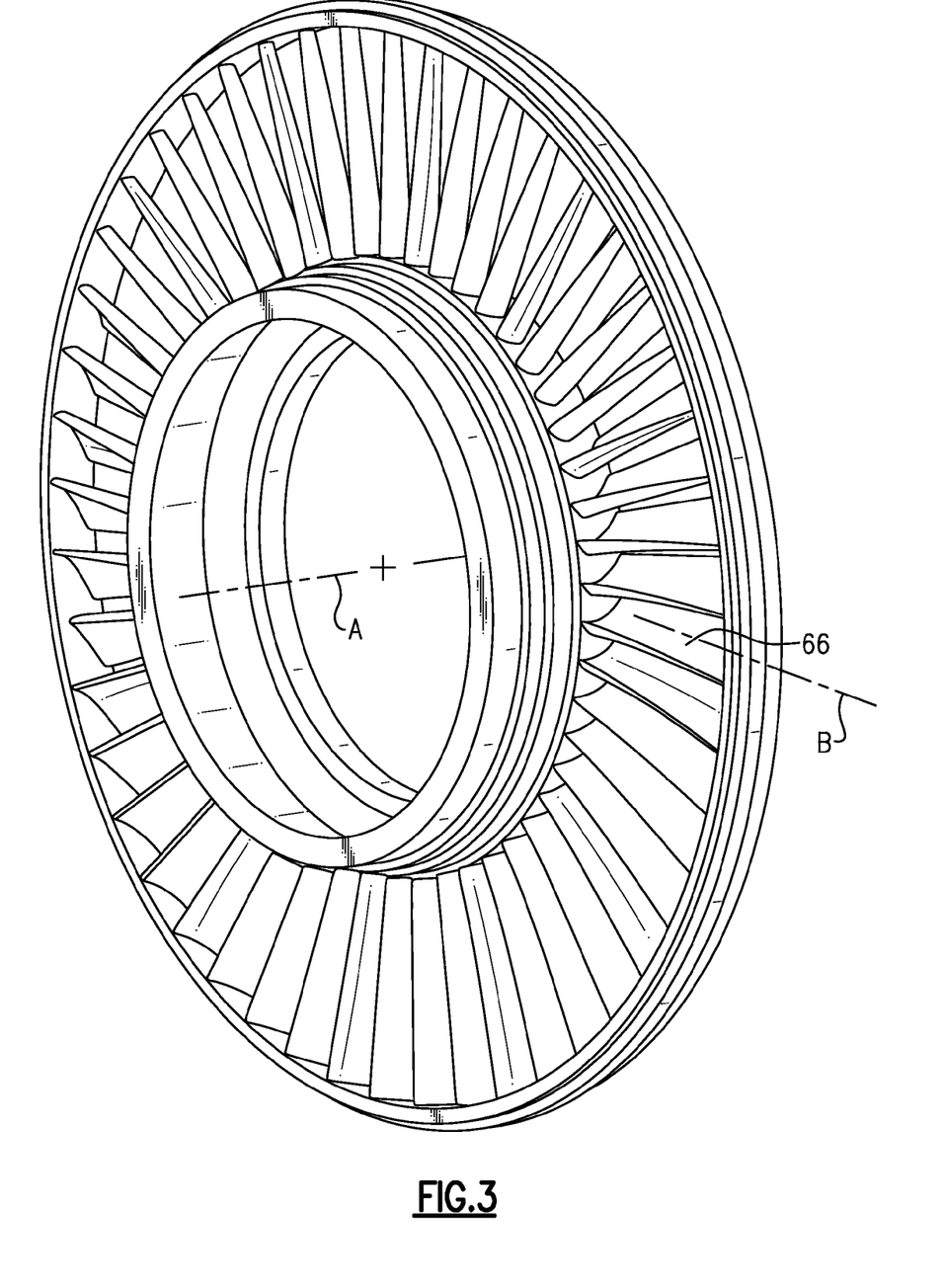
FIG. 3 is an enlarged perspective view of an example rotor disk of the Low Pressure Turbine section.
Figure 4:
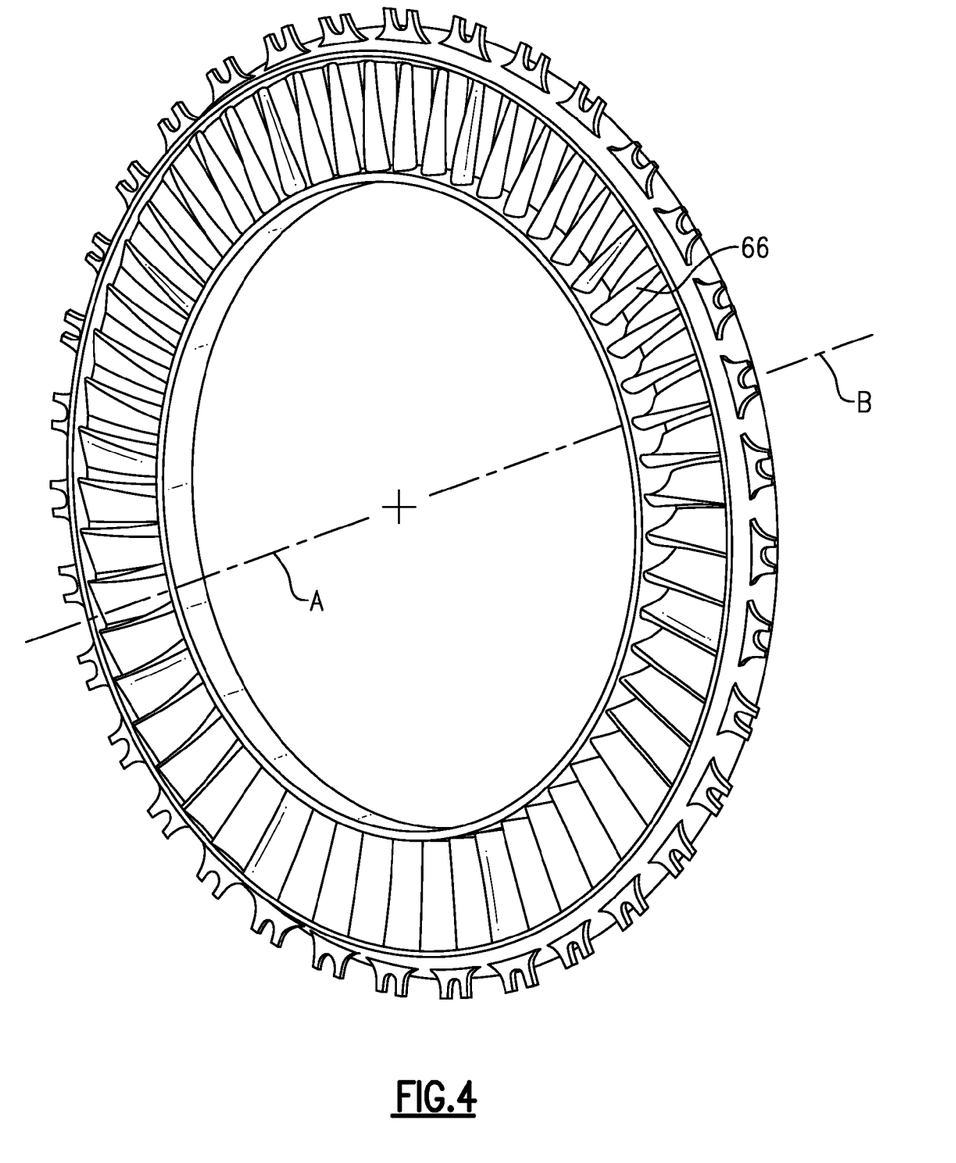
FIG. 4 is an enlarged perspective view of an example stator vane structure of the Low Pressure Turbine section.

With reference to FIG. 2, the low pressure turbine 46 generally includes a low pressure turbine case 60 with a multiple of low pressure turbine stages. The stages include a multiple of rotor structures 62A, 62B, 62C interspersed with vane structures 64A, 64B. Each of the rotor structures 62A, 62B, 62C and each of the vane structure 64A, 64B may include airfoils 66 manufactured of a ceramic matrix composite (CMC) material typically in a ring-strut ring full hoop structure (FIGS. 3 and 4). It should be understood that examples of CMC material for componentry discussed herein may include, but are not limited to, for example, S200 and SiC/SiC. Although depicted as a low pressure turbine in the disclosed embodiment, it should also be understood that the concepts described herein are not limited to use with low pressure turbines as the teachings may be applied to other sections such as high pressure turbines, high pressure compressors, low pressure compressors, as well as intermediate pressure turbines and intermediate pressure compressors of a three-spool architecture gas turbine engine.

Figure 5:
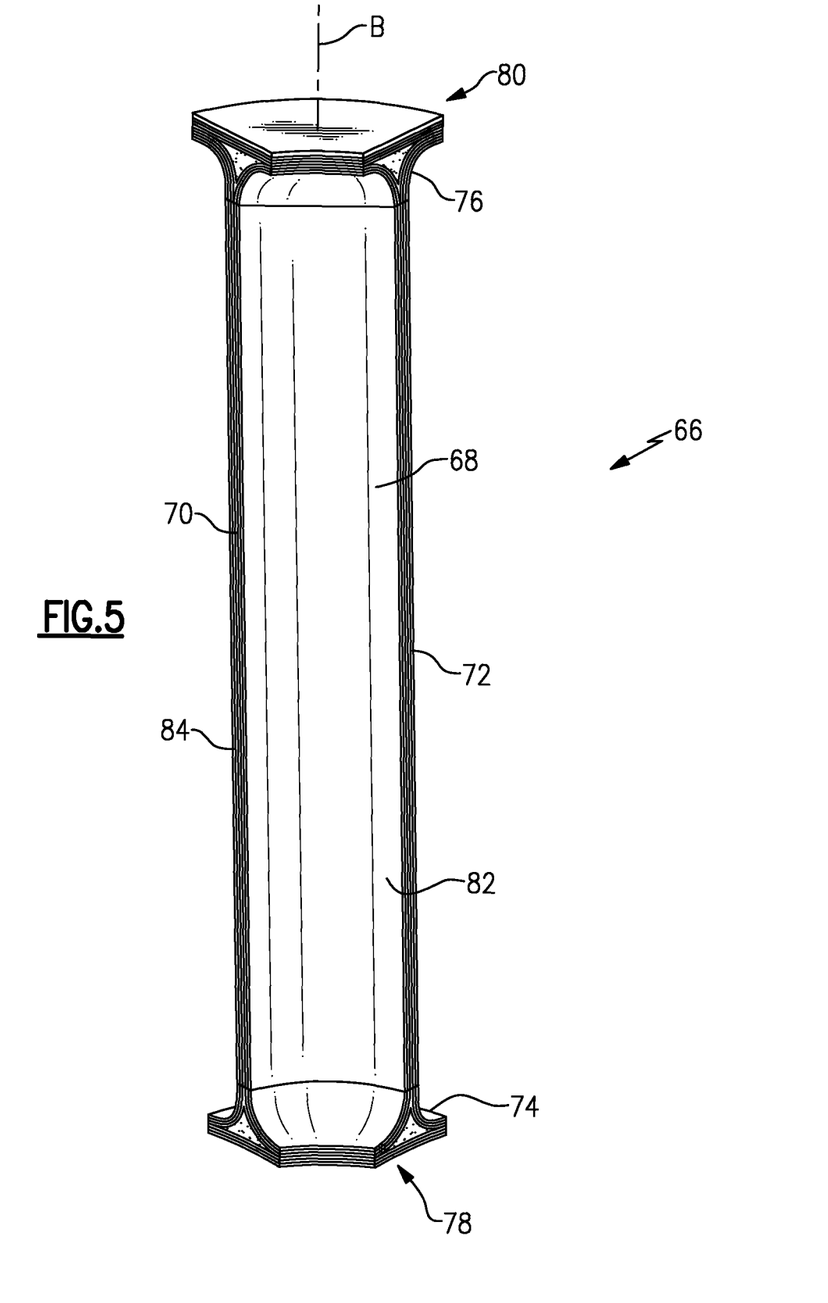
FIG. 5 is a perspective view of a CMC vane structure for a gas turbine engine.

With reference to FIG. 5, one CMC airfoil 66 "singlet" usable with a ring-strut-ring full hoop structure is illustrated. Although a somewhat generic airfoil 66 will be described in detail hereafter, it should be understood that various rotary airfoils or blades and static airfoils or vanes may be particularly amenable to the fabrication described herein.

The CMC airfoil 66 generally includes an airfoil portion 68 defined between a leading edge 70 and a trailing edge 72. It should be understood that an airfoil portion 68 with twists of between, for example, 90-120 degrees may be readily included. Each airfoil 66 includes a fillet section 74, 76 to provide a transition T-section between the airfoil portion 68 and a platform segment 78, 80. The platform segments 78, 80 are adjacent an inner diameter and an outer diameter of the core gas path C (FIG. 2). The airfoil portion 68 includes a generally concave shaped portion which forms a pressure side 82 and a generally convex shaped portion which forms a suction side 84.

Figure 6:
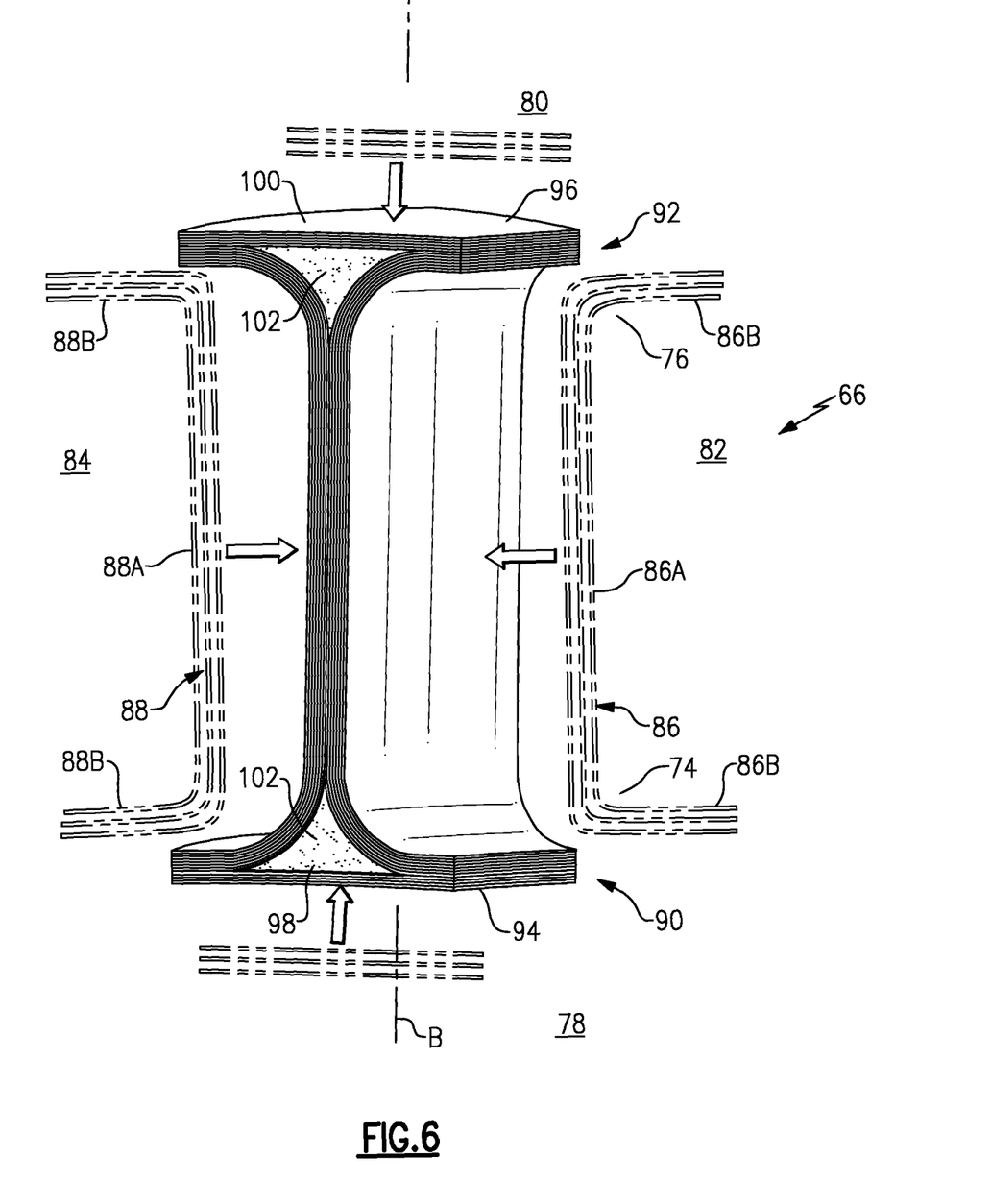
FIG. 6 is an exploded schematic view of the CMC vane structure illustrating a ply arrangement disclosed herein.

With reference to FIG. 6, the pressure side 82 and the suction side 84 may be formed from a respective first and second multiple of CMC plies 86, 88 which may be bonded together along a central airfoil axis B within a first airfoil portion 86A, 88A which is at least partially parallel to the airfoil axis B of the airfoil portion 68. The airfoil portion 68 may be fabricated such that the CMC structural fibers of the respective first and second multiple of CMC plies 86, 88 are arranged to define a radius outward from the airfoil axis B. That is, the pressure side 82 and the suction side 84 along with the inner and outer core gas path forming platform segments 78, 80 may be formed with a generally "C" shaped CMC ply orientation by the respective first and second multiple of CMC plies 86, 88.

The multiple of CMC plies 86, 88 bend apart to define a generally perpendicular orientation to form the radiused fillet sections 74, 76. That is, the multiple of CMC plies 86, 88 bend apart at a second airfoil portion 86B, 88B which is at least partially transverse to the airfoil axis B to form the fillet sections 74, 76. The fillet sections 74, 76 blend the airfoil portion 68 into the platform segments 78, 80. The outer cap surfaces 90, 92 of the platform segments 78, 80 are then capped by, for example, a third and fourth multiple of CMC plies 94, 96 which are generally transverse to the airfoil axis B to form the T-section. The platform segments 78, 80 may include unidirectional plys which are aligned tows with or without weave, as well as additional or alternative fabric plies to obtain a thicker platform segment if so required.

Triangular areas 98, 100 at which the multiple of CMC uni-tape plies 86, 88 bend apart to form the fillet sections 74, 76 are filled with a filler 102 such as a CMC fabric filler material often referred to as a "noodle" of, for example, a chopped fiber and a tackifier. The CMC fabric filler material may additionally be utilized in other areas where pockets or lack of material exist relative to the forming of a feature. These areas may have debited properties but are typically located in areas where they may exist without compromising structural integrity.

Figure 7:
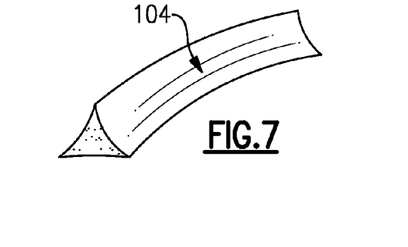
FIG. 7 is a perspective view of a hard insert for use within a T-section of an airfoil ply arrangement.

With reference to FIG. 7, the filler 102 may alternatively be a rigid component 104. It should be understood that examples of such a filler may include monolithic ceramic material such as a silicon carbide, silicon nitride or a metal alloy material. The rigid component 104 may be generally triangular in cross-section shaped to fill the triangular areas 98, 100. That is, the filler 102 may be preformed to facilitate assembly into the pockets.

Figure 8:
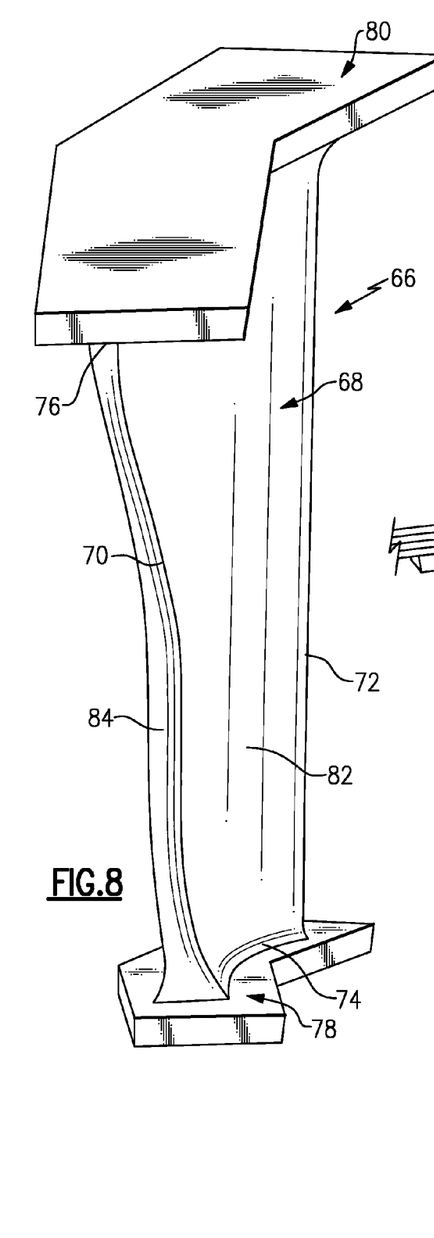
FIG. 8 is a perspective schematic view of the CMC airfoil structure illustrating a chevron platform.
Figure 9:
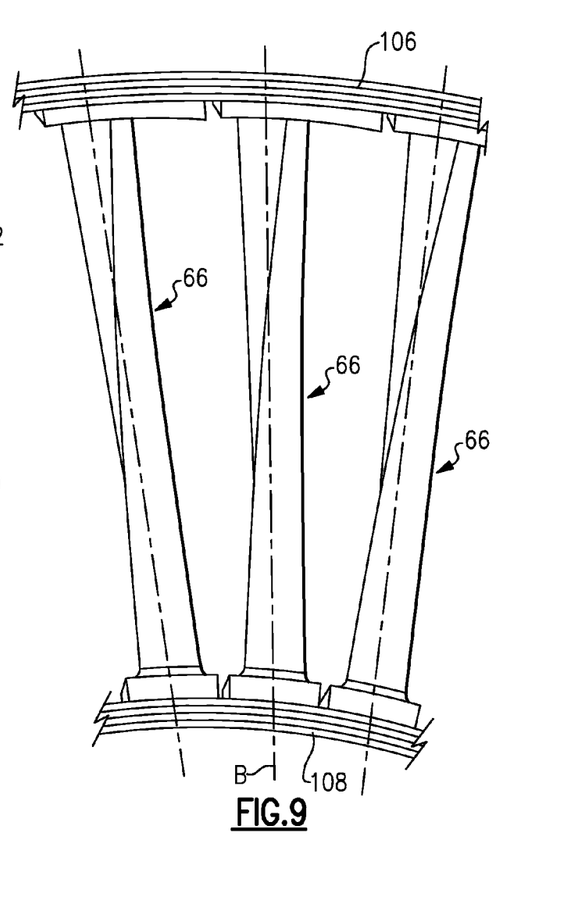
FIG. 9 is an enlarged front perspective view of a CMC airfoil bonded within an inner and outer full hoop ring.

In the disclosed non-limiting embodiment, either or both of the platform segments 78, 80 may be of a circumferential complementary geometry such as a chevron-shape (FIG. 8) to provide a complementary abutting edge engagement of each adjacent platform segment to define the inner and outer core gas path. That is, the CMC airfoil 66 are assembled in an adjacent complementary manner to form a ring of airfoils within a CMC outer ring 106 and a CMC inner ring 108 with the respectively adjacent platform segments 78, 80 to form full hoops (FIG. 9).

The CMC outer ring 106 and the CMC inner ring 108 utilize the CMC hoop strength characteristics to form a full hoop shroud in a ring-strut-ring structure. It should be understood that the term full hoop is defined herein as an uninterrupted member such that the airfoils need not pass through apertures formed therethrough.

Figure 10:
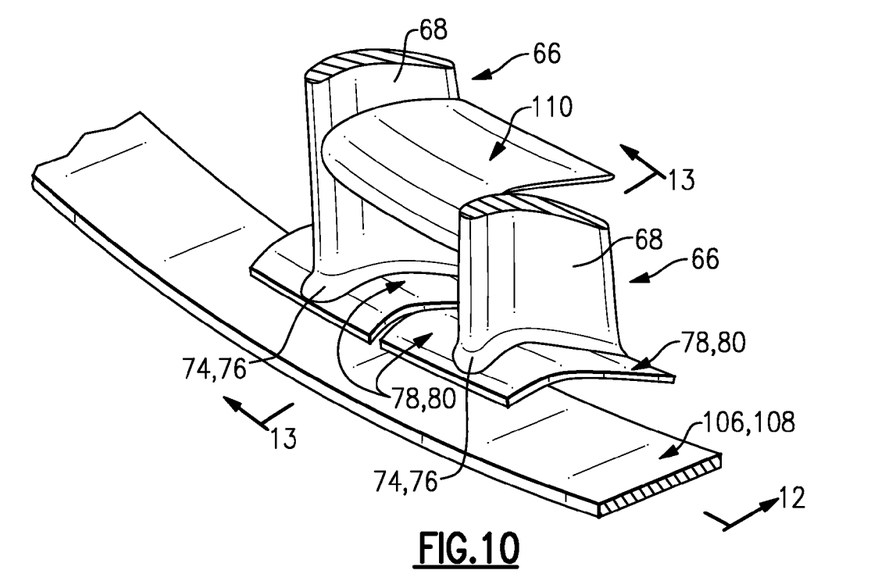
FIG. 10 is an exploded view of an example stator vane structure.
Figure 11:
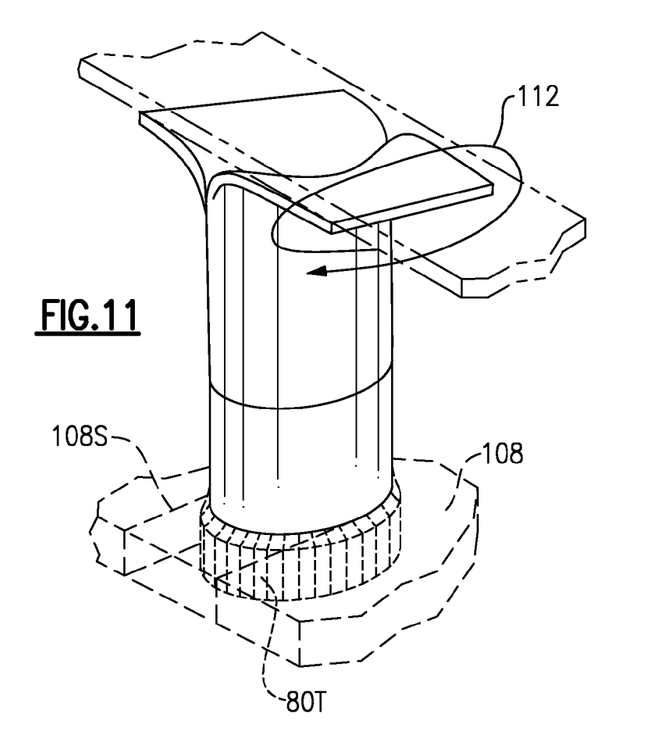
FIG. 11 is an expanded view of a stator vane structure slot and tab assembly according to another non-limiting embodiment.

With reference to FIG. 10, the platform segments 78, 80 are adjacent to the respective CMC outer ring 106 and the CMC inner ring 108 in the illustrated exploded view. It should be understood that although only a single assembly associated with the platform segment 78 and the respective CMC outer ring 106 is described and illustrated in detail hereafter, the platform segment 80 and the respective CMC inner ring 108 may additionally be assembled in a similar manner. That is, both may be assembled in an equivalent manner or one may be so assembled with the other manufactured in, for example, a tab 80T and slot 108S (FIG. 11) architecture.

The platform segments 78 of a respective multiple of airfoils 66 are arranged in a circumferentially abutted engagement within the respective CMC outer ring 106. An insert 110 is located between each pair of airfoil portions 68 over the adjacent platform segments 78. The insert 110 may be manufactured of CMC material, monolithic ceramic or metal alloy. That is, the insert 110 is a hard airfoil shaped component which defines a flow surface for the core flow.

Figure 12:
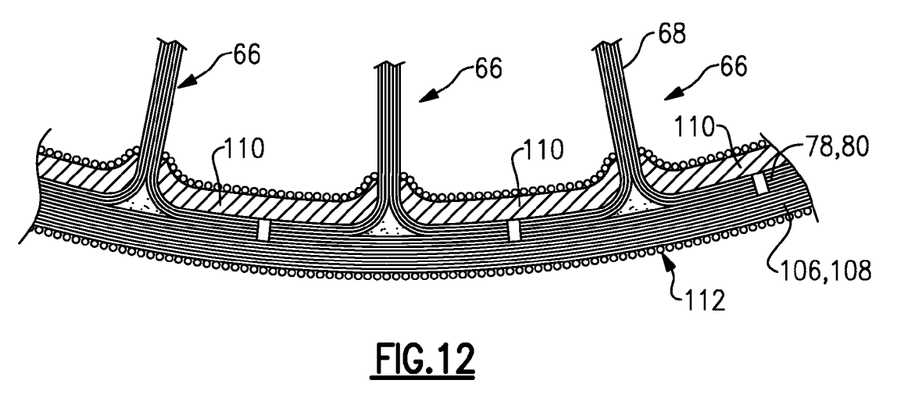
FIG. 12 is a sectional view of the stator vane structure.
Figure 13:
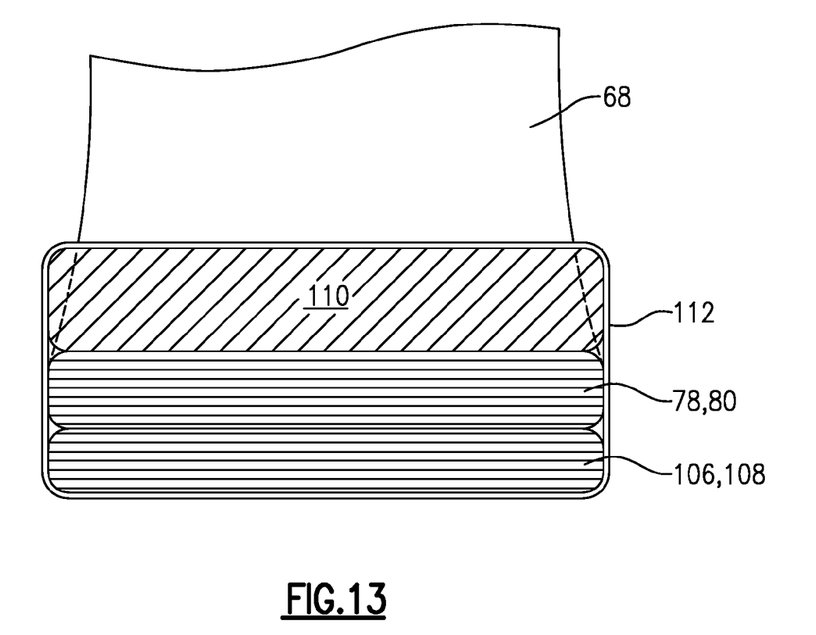
FIG. 13 is a lateral sectional view of the stator vane structure transverse to FIG. 12.

The insert 110 facilitates shaping of the fillet sections 74, 76 as well as provides a smooth surface to receive overwrap 112 (FIG. 12). The overwrap 112 may be formed of a tow which is a collection of fibers such as a silicon based fiber, a uni-tape, or cloth that is wrapped around the insert 110 and the CMC outer ring 106 to sandwich the platform segments 78 therebetween to provide a self supporting structure (FIG. 13).

The overwrap 112 is wound in a continuous spiral over the vane fillet section 74 to thereby reinforce the T-section of the airfoil 66, and bias the plys in the T-section toward the CMC outer ring 106. The overwrap 112 thereby clamps the T-section toward the CMC outer ring 106 to reduce the potential for delamination and minimize the stress riser associated with the displaced layers as plys in compression, or otherwise constrained, are less likely to delaminate at a given load. This net increase in capability permits each of the vane singlets to carry cantilevered loads. The disclosed fabrication approach allows for ease of production for a singlet or multiple airfoil cluster with a relatively more durable structure.

It should be understood that like reference numerals identify corresponding or similar elements throughout the several drawings. It should also be understood that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A vane structure for a gas turbine engine comprising:
a ring defined about an axis;
an airfoil section with a platform segment abutting said ring, said airfoil section comprising a multiple of CMC plies;
an insert adjacent to said platform segment; and
an overwrap wound around said ring, said insert, and a fillet portion of said multiple of CMC plies of said airfoil section in a continuous spiral, said overwrap biasing said multiple of CMC plies toward said ring.

2. The vane structure as recited in claim 1, wherein said airfoil section is within a Low Pressure Turbine.

3. The vane structure as recited in claim 1, wherein said ring is a CMC outer ring.

4. The vane structure as recited in claim 1, wherein said ring is a CMC inner ring.

5. The vane structure as recited in claim 1, wherein said airfoil section comprises a first and second multiple of CMC plies, and said platform segment comprises a third multiple of CMC plies, wherein said first and second multiple of CMC plies are each generally C shaped.

6. The vane structure as recited in claim 5, wherein said platform segment includes a filler.

7. The vane structure as recited in claim 6, wherein said filler is a preformed monolithic ceramic member.

8. The vane structure as recited in claim 7, wherein said preformed monolithic ceramic member is generally triangular in cross-section.

9. The vane structure as recited in claim 1, wherein said overwrap includes a tow.

10. The vane structure as recited in claim 1, wherein said insert is a preformed monolithic ceramic member.

11. The vane structure as recited in claim 1, wherein said insert is airfoil shaped.

12. The vane structure as recited in claim 1, wherein:
said airfoil section comprises a multiple of CMC plies; and
said overwrap is wound in a continuous spiral to sandwich said platform segment between said insert and said ring, and to reduce the potential for delamination of said airfoil section.

13. The vane structure as recited in claim 1, further comprising:
a second ring about said axis, wherein said airfoil section comprises a second platform segment abutting said second ring, and said ring and said second ring comprise CMC.

14. A vane structure for a gas turbine engine comprising:
a ring defined about an axis;
a first airfoil section with a first T-shaped platform segment abutting said ring;
a second airfoil section with a second T-shaped platform segment abutting said ring;
an insert adjacent to said first T-shaped platform segment and said second T-shaped platform segment; and
an overwrap wound around said ring, said first T-shaped platform segment, and said second T-shaped platform segment in a continuous spiral over a fillet section of said first and second T-shaped platform segments, said overwrap biasing said first and second airfoil sections toward said ring.

15. The vane structure as recited in claim 14, wherein said ring is manufactured of a ceramic matrix composite (CMC) material oriented around said axis.

16. The vane structure as recited in claim 14, wherein said first T-shaped platform segment and said second T-shaped platform segment each includes a multiple of ceramic matrix composite (CMC) plies that bend apart to define a generally perpendicular orientation which forms fillets.

17. The vane structure as recited in claim 16, further comprising a filler within said first T-shaped platform segment and said second T-shaped platform segment.

18. The vane structure as recited in claim 17, wherein said filler is a preformed monolithic ceramic member generally triangular in cross-section.

19. The vane structure as recited in claim 14, wherein said overwrap includes a tow.

20. The vane structure as recited in claim 14, wherein said insert is a preformed monolithic ceramic member.

21. The vane structure as recited in claim 14, wherein said insert is airfoil shaped.

22. A method of assembling vane structure for a gas turbine engine comprising:
Positioning an airfoil section with a platform section adjacent to a ring, said airfoil section comprising a multiple of CMC plies;
Positioning an insert at least partially over the platform segment; and
Winding an overwrap around the ring, the insert, and a fillet portion of said multiple of CMC plies of said airfoil section in a continuous spiral, said overwrap biasing said multiple of CMC plies toward said ring.

23. The method as recited in claim 22, further comprising:
bending apart a multiple of ceramic matrix composite (CMC) plies to define a generally perpendicular orientation to form the platform segment.

* * * * *